US012779676B2

(12) United States Patent
Apte et al.

(10) Patent No.: US 12,779,676 B2
(45) Date of Patent: Nov. 3, 2026

(54) AUTOMATED NAIL SHAPING OR MODIFICATION

(71) Applicant: 10Beauty, Inc., Burlington, MA (US)

(72) Inventors: Renuka Ajay Apte, San Francisco, CA (US); Aaron James Feldstein, San Francisco, CA (US); Erik Oscar Sunden, San Francisco, CA (US); Christopher Sean Masterson, San Francisco, CA (US)

(73) Assignee: 10Beauty. Inc., Burlington, MA (US)

( * ) Notice: Subject to any disclaimer, the term of this patent is extended or adjusted under 35 U.S.C. 154(b) by 474 days.

(21) Appl. No.: 18/186,041

(22) Filed: Mar. 17, 2023

(65) Prior Publication Data

US 2023/0294280 A1 Sep. 21, 2023

Related U.S. Application Data

(60) Provisional application No. 63/321,070, filed on Mar. 17, 2022.

(51) Int. Cl.

| | |
|---|---|
| ***B25J 9/16*** | (2006.01) |
| ***A45D 29/02*** | (2006.01) |
| ***A45D 29/05*** | (2006.01) |
| ***A45D 29/14*** | (2006.01) |
| ***A45D 29/16*** | (2006.01) |
| ***A45D 29/17*** | (2006.01) |

(52) U.S. Cl.

CPC .............. *B25J 9/163* (2013.01); *A45D 29/02* (2013.01); *A45D 29/05* (2013.01); *A45D 29/14* (2013.01); *A45D 29/16* (2013.01); *A45D 29/17* (2013.01); *B25J 9/1697* (2013.01)

(58) Field of Classification Search

CPC ......... B25J 9/163; B25J 9/1697; A45D 29/02; A45D 29/05; A45D 29/14; A45D 29/16; A45D 29/17

See application file for complete search history.

(56) References Cited

U.S. PATENT DOCUMENTS

| | | | | |
|---|---|---|---|---|
| 9,538,825 | B2 * | 1/2017 | Yamasaki | A45D 29/00 |
| 10,426,244 | B2 * | 10/2019 | Papshev | B33Y 30/00 |
| 10,542,810 | B1 * | 1/2020 | Auguste | A45D 29/00 |
| 2008/0264438 | A1 * | 10/2008 | Clelland | A45D 29/04 132/76.4 |
| 2017/0154214 | A1 * | 6/2017 | Freeman | G06T 7/75 |
| 2019/0095747 | A1 | 3/2019 | Sasaki | |
| 2019/0104823 | A1 | 4/2019 | Giron et al. | |
| 2020/0268125 | A1 | 8/2020 | Apte et al. | |
| 2020/0345121 | A1 | 11/2020 | Leong | |

(Continued)

OTHER PUBLICATIONS

"The Principle of Kinematic Constraint", Campbell, https://practicalprecision.com/kinematic-constraint/, Accessed May 5, 2025, (Year: 2016).*

(Continued)

*Primary Examiner* — Wade Miles
*Assistant Examiner* — Jaewook Jung
(74) *Attorney, Agent, or Firm* — Mintz Levin Cohn Ferris Glovsky and Popeo, P.C.

(57) ABSTRACT

The present disclosure relates to a robotic apparatus and methods for automatic nail shaping or modification on natural or artificial fingernails or toenails.

42 Claims, 10 Drawing Sheets

(56) References Cited

U.S. PATENT DOCUMENTS

| | | | |
|---|---|---|---|
| 2021/0120935 | A1 | 4/2021 | Shashou et al. |
| 2021/0258450 | A1 | 8/2021 | Walia et al. |

OTHER PUBLICATIONS

"AI Nails It: Viral Manicure Robot Powered by GPU-Accelerated Computer Vision", Salian, https://developer.nvidia.com/blog/ai-nails-it-viral-manicure-robot-powered-by-gpu-accelerated-computer-vision/ (Year: 2021).*

International Search Report and Written Opinion, Patent Cooperation Treaty Application No. PCT/US2023/015539, Jun. 7, 2023, 15 pages.

International Search Report and Written Opinion, Patent Cooperation Treaty Application No. PCT/US2023/064669, Jul. 19, 2023, 16 pages.

* cited by examiner

AUTOMATED NAIL SHAPING OR MODIFICATION

CROSS-REFERENCE TO RELATED APPLICATION

This application claims priority to U.S. Provisional Application No. 63/321,070 filed on Mar. 17, 2022, which is incorporated by reference herein in its entirety.

FIELD

The present disclosure relates to systems and methods for automated nail shaping and modification, and more particularly for automatically controlling movement of a robotic system to shape or otherwise modify (e.g., trim, buff, etc.) nails of a user.

BACKGROUND

As nails grow, they must be cut and shaped to look pleasing, keep up with social trends, and to help attain a more robust coat of polish. Jagged cuticles or roughly cut nails interfere with the quality of the nail polish coat and how long it lasts. Typically, nail shaping is performed by a nail artist or manicurist using tools, such as abrasive emery boards, to remove or otherwise smooth unwanted portions of the nail tips or nail surface prior to applying nail polish. It is time consuming and commonly challenging to perform an attractive nail shaping and modification procedure.

SUMMARY

An automatic nail shaping or other modification system and method are disclosed. The system and method automate the nail shaping to make the process quick and easy, and avoid manual nail shaping by providing an automated solution.

The nail shaping system may be fully automated such that there is a selection of a desired nail shape (e.g., squared tip, rounded tip, oval tip, other shapes) and/or length (e.g., short, medium, long, or other specified lengths) for the system to provide. The user may insert a hand or foot into the system, and the system performs all the steps of nail shaping without further user input required after the selection. The user may provide the selection, or alternatively the system may provide the selection. The system may, for example, provide a default shape that is applied absent a selection, or the system may determine an optimal shape or length for a given user.

The system may itself switch between different tools as needed to achieve the desired nail shape. The nails may be scanned and sensor data or a sensor representation for the nail (such as a nail image) may be provided as input to the system for performance of the nail shape. In some embodiments, the sensor data is input to an artificial intelligence (AI) or machine learning model that manages the providing of the nail shape. The model may determine how much nail material to remove, and may inscribe the selected shape (selected by the user or by the system) onto the nail data within the system, such as by inscribing the shape or other modifications onto an image of the nail or an image of each nail. The system then plans a path for shaping or modifying the nails based on this input, in which the appropriate tools are automatically selected and automatically moved into position for nail shaping. In some embodiments, components on a motion platform provide movement of the end effector along multiple axes to perform the nail shaping. One or more different tools are automatically selected and used until the appropriate amount of nail material is removed to achieve the desired shape or length, or until other modifications or services are completed.

The nail shaping or modification is an automated process performed by a system (e.g., a robotic nail shaping system). Other than possibly receiving a nail shape or modification selection from a user, all other steps may be performed automatically, without user input or selection.

In one embodiment, a system is disclosed that comprises a placement area configured for a user to place at least one digit having a nail, a motion platform adjacent the placement area, and an end effector movably connected to the motion platform and positioned near the placement area The end effector comprises one or more tools for nail shaping. Also included are one or more sensors near the designated placement area and configured for scanning the nail of the user to generate a sensor representation for the nail. Further included is an artificial intelligence (AI) model trained for receiving as input the sensor representation of the nail and for inscribing a selected nail shape onto the sensor representation, where the inscribed selected nail shape on the sensor representation comprises an output of the AI model. In addition, there is a path planning model configured to receive the output of the AI model and to plan a path of movement for the end effector to shape the nail based on the output of the AI model. The end effector is configured to move on the motion platform into position based on the planned path for applying the one or more tools to the nail to shape the nail.

In other embodiments, the one or more sensors comprise one or more cameras. In addition, the one or more sensors may comprise a 3D sensor suite. The 3D sensor suite may comprise one or more cameras capable of generating a 3D spatial point cloud. In some embodiments, the sensor representation comprises one or more images of the nail to be shaped, and the 3D spatial point cloud is generated based on the one or more images. This provides a representative surface of the nail, and the path is planned based on the representative surface generated by the cameras to provide the selected nail shape.

In some embodiments, the selected nail shape is selected by the user. In some embodiments, the one or more tools of the end effector comprise a first tool and a second tool, and the drive motor on the end effector is configured to move the first tool away from the nail following use and to move the second tool into position to perform further shaping of the nail. In further embodiments, the end effector comprises at least a third tool, and the drive motor on the end effector is configured to move the third tool into position for modifying the nail.

In additional embodiments, the system is configured to move the end effector away from the placement area to perform a tool replacement to remove a first tool of the one or more tools and replace it with a second tool of the one or more tools, wherein the second tool is moved back into position at the placement area for additional nail shaping.

In some embodiments, each of the one or more tools is connected to a nail shaping subassembly that is replaceable to attach a different nail shaping subassembly to the end effector to provide a different tool. Each nail shaping subassembly may comprise a drive motor. Each nail shaping subassembly may comprise a kinematic mount interface. In embodiments, the nail shaping subassembly comprises a drive motor and a tool support holding two or more tools.

The drive motor is configured to move the tools to position each tool at the nail for performing a specific nail shaping procedure.

In embodiments, the one or more tools comprise different tools for performing different nail shaping tasks. The one or more tools may be selected from a group consisting of: an nail file, a nail clipper, a nail buffer, a cuticle trimmer, a cuticle oil depositer, and a nail cleanser. The one or more tools may comprise nail shaping tools each having variable grit surfaces, and different ones of the tools may be selected based on a level of grit needed to perform a specific nail shaping procedure. In addition, at least one of the tools may be configured to be positioned at an end of the nail for shaping an edge of the nail. Further, at least one of the tools may be configured to be positioned above the nail for modifying a top surface of the nail.

In some cases, the system includes a frame having a top support and side supports, and the frame has the one or more sensors mounted to it by sensor supports. Additionally, the one or more sensors may comprise two cameras, each mounted on either side of the frame, the cameras having lens supports aimed at the placement area. The motion platform may be mounted on a base platform by motion platform supports. In some embodiments, at least one z-axis track is mounted to the motion platform. The x-axis track may be moveably mounted to the z-axis track, where the x-axis track is designed to slide back and further along a z axis to move the end effector forward and backward relative to the nail. The x-axis track may be configured to allow the end effector to slide from side to side along the motion platform to move the end effector from side to side relative to the nail. The y-axis track may be moveably mounted to the x-axis track. The y-axis track may thus be designed to move the end effector up and down relative to the nail.

In further embodiments, the placement area comprises a restraint for holding the digit in place during the shaping of the nail. The placement area may also comprise a resting support for resting a hand of a user during nail shaping. The end effector may be moveable along at least three motion axes for shaping of the nail.

The system may be a robotic system for automated shaping of the nail of the user without requiring user input during the shaping. The end effector may be moveable for replacing the one or more tools for nail shaping with one or more tools for nail polishing following the nail shaping. The system moves the end effector to polish the nail.

Further embodiments include a method comprising receiving, at a designated placement area, at least one digit of the user having a nail, and scanning the nail of the user with one or more sensors to generate at least one sensor representation of the nail. The method also includes inputting, into an artificial intelligence (AI) model, the sensor representation of the nail, the AI model inscribing the selected nail shape onto the sensor representation as an output. Additionally, the method includes planning, based on the output of the AI model, a path for shaping of the nail. The method also includes moving, based on the planned path, an end effector having one or more tools into position for applying the one or more tools to the nail for shaping of the nail.

In some embodiments, the method includes receiving, at a user interface, a selection by a user of a nail shape or a nail length. The one or more tools of the end effector may comprise a first tool and a second tool, and further comprising moving, based on the planned path, the end effector with a second tool into position for applying the second tool to the nail for nail shaping. The method may include moving, based on the planned path, the end effector with a third tool into position for applying the third tool to the nail for polishing the nail. The method also may comprise moving the first tool away from the nail following use and moving the second tool into position to perform further shaping of the nail.

In additional embodiments, the method includes generating a 3D spatial point cloud with based on the at least one image of the nail to be shaped. This provides a representative surface of the nail. The path may be planned based on the representative surface generated to get the desired shape.

In some embodiments, the method includes generating a 3D spatial point claim with a 3D sensor suite. The sensor representation may comprise one or more images of the nail to be shaped. The 3D spatial point cloud is generated based on the one or more images, which provides a representative surface of the nail. The method may also include planning the path based on the representative surface generated by the cameras to provide the selected nail shape.

In embodiments, the method includes moving the end effector away from the placement area to perform a tool replacement to remove a first tool of the one or more tools and replacing it with a second tool of the one or more tools. The second tool may be moved back into position at the placement area for additional nail shaping. The one or more tools may comprise different tools for performing different nail shaping tasks, wherein the one or more tools are selected from a group consisting of: an nail file, a nail clipper, a nail buffer, a cuticle trimmer, a cuticle oil depositer, and a nail cleanser. The one or more tools may also comprise nail shaping tools each having variable grit surfaces, and further comprising selecting tools based on a level of grit needed to perform a specific nail shaping procedure. The method may include moving the end effector along at least three motion axes for shaping of the nail.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments are described below. It is, however, expressly noted that the present disclosure is not limited to these embodiments, but rather it includes variations, modifications, and equivalents that are apparent to the person skilled in the art.

The present disclosure relates to automated services or automated treatment of a portion of the body of a user, such as the hands or the feet of the user. Some embodiments relate to services related to nails of the user (e.g., fingernails and/or toenails). In some embodiments, the services include nail shaping or other nail modification, including nail buffing, nail trimming, etc.

Described throughout is an example of an automated nail shaping system for shaping a user's nails or making other modifications or providing services or treatments to the nails, such as a nail shaping robotic device and methods performed by the device. While the description focuses primarily on uses involving a user's hand as the extremity placed in the system, and specifically fingers (phalanges or digits) with fingernails, it should be understood that all of the description may also apply to the user's feet as the extremities, including toes (also considered phalanges or digits) and toenails.

The nail services or procedures including nail filing, nail clipping, nail trimming, nail buffing, cuticle trimming, cuticle oil depositer, nail or digit cleansing, nail polishing, providing artificial nails, providing nail decals or nail patterns/nail art, providing gel or powder nail services, UV curing of nail polish, drying of nails, shaping of nails or cuticles, buffing of nails, foot or hand cleansing or soaking, massaging of a user's hands or feet, paraffin wax treatment on hands, feet, arms, delivering a henna pattern onto the user's hand, arm, among other treatments. In addition, a robotic apparatus is used as an example throughout, though the system may take other forms, as well.

Nail Shaping System

Figure 1:
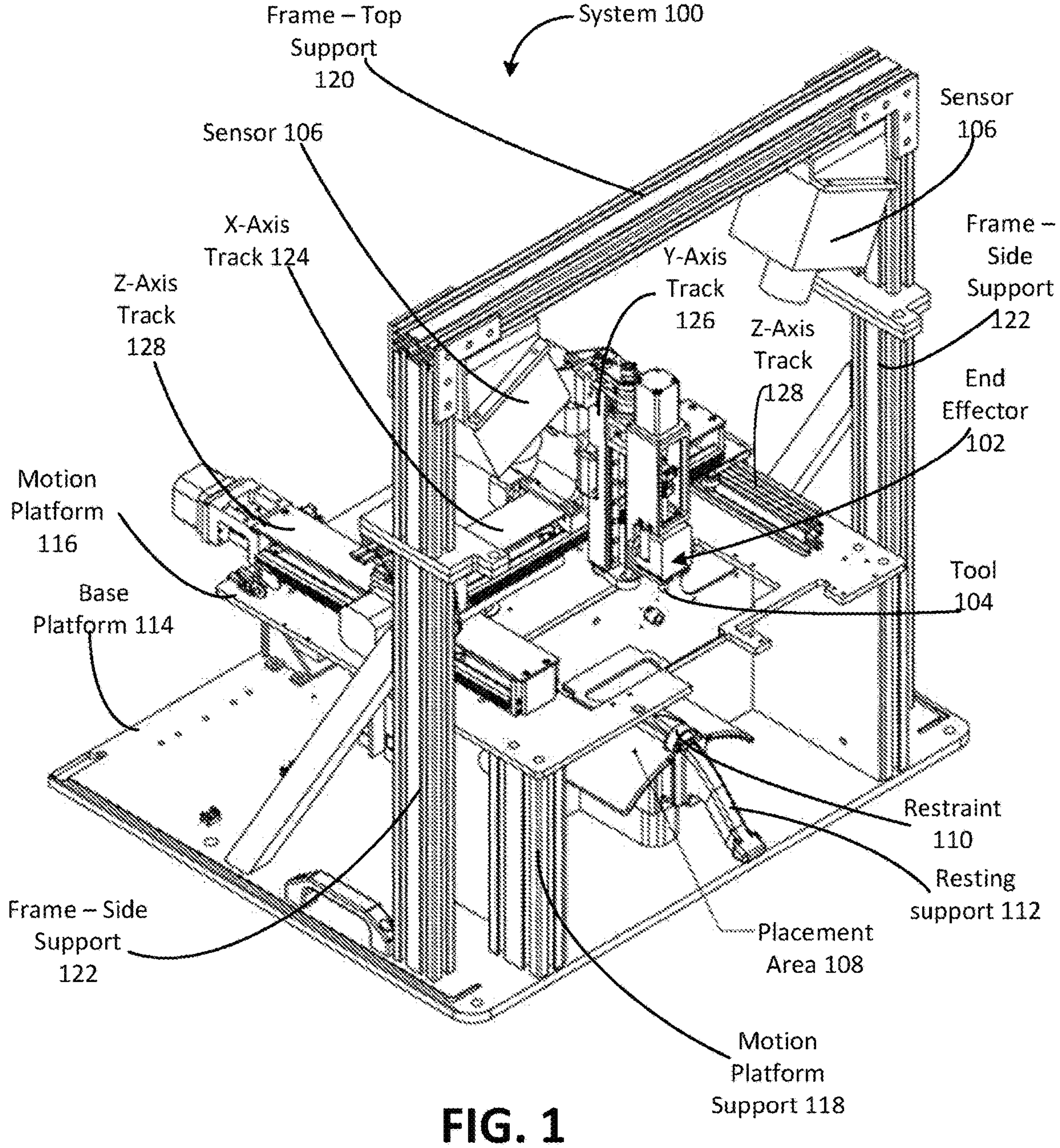
FIG. 1 is an isometric view of a system for nail shaping, in accordance with an embodiment.

FIG. 1 illustrates a front perspective view of a nail shaping or filing assembly or machine or system for shaping nails 100, according to an embodiment. The nail shaping or filing assembly or system 100 comprises a human machine interface (HMI), a placement area 108 for the user to place their hand/foot, a motion platform 116, one or more sensors 106 (e.g., a 3D sensor suite), an end effector 102, a shaping sub assembly 502 (see FIG. 5), and a debris collection sub assembly, among other components. In some embodiments, the system includes fewer or more components, or different components.

The HMI of the machine allows the user to select the desired shape of the nail to be filed. The HMI may include a user interface, such as a touch enabled screen, or one or more mechanical elements (buttons, switches, joystick, etc.), and an onboard computer. In one embodiment, the user interface that sits outside the machine on an outer cover or shell of the machine, or it may be separate from but near the machine. The onboard computer may apply an artificial intelligence (AI) or machine learning (ML) model and a path planning model to determine a personalized nail shaping treatment. The path planning model may use computer numerical control (CNC). The user interface, such as a touch enabled screen, may be connected to an onboard computer to allow the user to interact with the machine and to personalize the nail treatment.

The user may select from a number of predetermined nail shapes (e.g., square tip, rounded tip, oval tip, etc.) that can be attained through the nail filing assembly. In one embodiment, the user may also select a desired length (e.g., short, medium, long, very long) of nails. As one example, the system may display images of different nail shapes or lengths such that the user may select from a menu of different options based on what the shapes look like on a screen. The system, for example, could display multiple options of square-shaped tips with slightly different angles so that the user can select the desired shape of square tip.

In some embodiments, the machine selects one or both of the nail shape and length. The user may not make a selection, and the machine may use a default nail shape and length, such as by applying the most common or most popular shape and length. Alternatively the machine may selected a shape or length based on the user's digits or nails, and what the machine determines would be the shape or length that would best fit the user. As another example, the machine may select based on historical nail shaping that the user has performed, based on a user profile or stored selections the user made previously. The user places their hand (or foot or other extremity) onto a hand (or foot) rest or platform in a designated hand (or foot) placement area 108. The placement area 1087 is configured for the user to place at least one digital having a nail so that the nail can receive a nail service by the system 100. The placement area 108 includes a securing mechanism or restraint 110, in some embodiments, that grasps and secures in place the targeted digits or fingers, but allows the user to move away in the event of discomfort. The securing mechanism or restrain 110 may be a pincher or clasp, or an elastic retention band actuated by the user sliding or placing their hand onto the hand rest, among various other securing mechanism options. The securing mechanism may secure one or more fingers and/or a portion of the hand. In one embodiment, the user inserts one finger at a time for nail shaping. In another embodiment, the user places their hand on the hand rest with all of their fingers extended, and the end effector moves from finger to finger. Where a user's toenails are being shaped, the user may place a foot on the hand or footrest with all of the toes extended so the end effector can move from toe to toe. In some embodiments, the system may ask or require the user to adjust position occasionally. The placement area 108 may also include a resting support 112 portion on which a portion of the body, such as the hand or the foot, may rest while the digits are held in place by the restrain 110 in the placement area.

When the digits are in place to being the nail services, the system 100 may scan the nail using the one or more sensors 106. The sensors 106 may be near or adjacent the placement area 108. In the embodiment shown in FIG. 1, there are two sensors 106, though there can be any number of sensors.

The one or more sensors 106 may be arranged in various ways around the system 100 including positioned above or below, or on the side of, the placement area 108 to scan the user's nails. In the embodiment shown in FIG. 1, the sensors 106 include two sensors above the placement area 108 positioned on either side of the placement area. In this embodiment, the sensors are positioned on a frame of the device, either on a top support 120 of the frame or on one or both side supports 122 of the frame. In FIG. 1, the frame includes two side supports 122 that are attached to a base platform 114, and one top support 120 that is connected to the side supports 122. In FIG. 1, the sensors are positioned such that they each contact the top support 120 and one side support 122. In some embodiments, the sensors 106 are positionable on the frame, such that the position can be adjusted according to the use of the system 100 or to improve the capturing of the sensor representation.

The sensors 106, in some embodiments, are a 3D sensor suite. The sensor may be any kind of sensor that may capture a reading or conduct an analysis or interrogation of a nail, including a camera, a depth sensor, a pressure sensor, a gyroscope, a temperature sensor, a proximity sensor, an accelerometer, and infrared (IR) sensor, a light sensor, an ultrasonic sensor, a color sensor, a humidity sensor, a tilt sensor, and other types of sensors. In some cases, the system 100 more than one kind of sensor to capture different types of information about the user's nail.

The one or more sensors 106 are configured for scanning the nail of the user to generate a sensor representation for the nail. In some embodiments, the AI model is trained for receiving as input the sensor representation of the nail and for inscribing a selected nail shape onto the sensor representation, the inscribed selected nail shape on the sensor representation comprising an output of the AI model. For example, the sensors may take an image of the nail. The image of the nail, and any user provided selections regarding nail shape and/or length, may be provided as input to an analysis module, such an AI model that determines how much nail material to remove from various parts of the nail to match the selected nail shape. For example, the current nail may be unevenly shaped such that more material must be removed from one side or the other to achieve the desired nail shape.

The AI model may inscribe the user-selected shape into the image taken of the nail as it exists prior to shaping to determine a minimum amount of nail material that is needed to be removed to achieve the selected nail shape. The AI model can optimize to remove the least amount of material possible.

After the AI model determines nail material to be removed in order to achieve the desired shape, a path planning model generates a path plan for the end effector to follow for the nail removal. The path planning model is configured to receive the output of the AI model and to plan a path of movement for the end effector to shape the nail based on the output of the AI model. The motion platform 116 is configured to move the end effector into position based on the planned path for applying tools to the nail to shape the nail. This path plan allows for the system to perform a completely automated procedure from the point at which the user inserts his or her hand/foot into the system 100 to the point at which all of the nails are shaped.

In the embodiment of FIG. 1, the motion platform 116 holds the components that allow for the movement of the end effector 102. The motion platform 116 is connected to the base platform 114 by one or more motion platform supports 118, and sits adjacent the placement area 108. The motion platform 116 is positioned above the placement area 108, according to some embodiments, to allow the end effector to move above the user's nails. In the embodiment of FIG. 1, the motion platform 116 includes tracks that allow for movement of the end effector 102. The tracks may be arranged in any manner that allows the end effector 102 along more than one axis. There may be one or more of each of an x-axis track 124, a y-axis track 126, and a z-axis track 128.

In the embodiment of FIG. 1, there are z-axis tracks 128 are elongated structures positioned on either side of the motion platform 116. These tracks 128 are connected to the motion platform to allow movement of the end effector 102 along the z axis such that the end effector can slide along these tracks back and forth from front and back of the device so that the end effector can move forwards and backwards when shaping the nail. In the embodiment of FIG. 1, an x-axis track 124 is moveably connected to the z-axis tracks 128. The x-axis track 124 is an elongated structure that sits on top of the z-axis tracks 128 extending from one track 128 to the other track 128 on the opposite side. The x-axis track 124 slides back and forth on the z-axis tracks 128 to allow the end effector 102 to move along the z axis. The end effector is also slidable along the x-axis track 124 to allow the end effector to move from side-to-side in the system 100 along the x axis. In addition, the end effector 102 is moveably attached to a y-axis track 126 that itself is moveably connected to the x-axis track 124. The end effector 102 can slide up and down on the y-axis track 126 to allow it to move along the y axis. All of these tracks together allow for movement of the end effector 102 such that it can shape the nail of the user with one or more tools 104.

In some embodiments, the nail shaping process is a two-stage process where the nail is first cut or abraded in a more substantial, more coarse manner to remove nail material to reduce the length of the nail. The reduction in nail length can occur with a nail cutter/trimmer/clipper tool 104 to trim the nail or can occur with a nail file that is sufficiently coarse to file the nail down to a shorter length. In a second stage, the nail is shaped more finely, with a finer or less coarse nail file tool 104 to shape the nail according to the desired shape chosen by the user. In addition, there may be one or more tools 104 that shape or modify the top or upper surface of a nail, such as a nail file tool 104 composed of a fine grit, or nail buffer tool 104 for buffing the nail surface. There may be various different nail files or buffers of varying levels of grit or coarseness or fineness. In addition, there may be various other nail tools 104, including a cuticle trimmer, a cuticle oil depositer, a nail cleanser, and a massager.

In some embodiments, one or more of the materials or tools that contact the nail are removable for cleaning or for replacement with a clean material or tool. In some embodiments, the system automatically cleans its tools or replaces used or dirty tools with clean tools. For example, the used abrasive or sandpaper-like material of a nail file may be replaced by the assembly with fresh, clean abrasive material. As another example, the system 100 may have a washing station including water or a cleaning solution into which the system may dip the tools or otherwise wash the tools automatically.

In some embodiments, the system 100 includes a tool replacement area which the robot moves to for replacement of a current tool on the end effector with a different tool. The system 100 may automatically conduct this replacement operation based on its determined nail shaping plan to remove the nail material. The nails may also be prepared for nail polishing following the nail shaping procedures. The system may automatically replace the nail shaping tool with a nail polishing tool. In these embodiments, the system 100 may include an option for the user to select nail polish color and type either before the nail shaping or after the shaping. The selected polish maybe deposited on the nail by the end effector 102. This may be automatically deposited with a nail brush, a nozzle, a rollerball tip, a pen, a dip, a powder, or other manner of painting the nail with the end effector 102 or with a different end effector where the system includes more than one.

Figure 2:
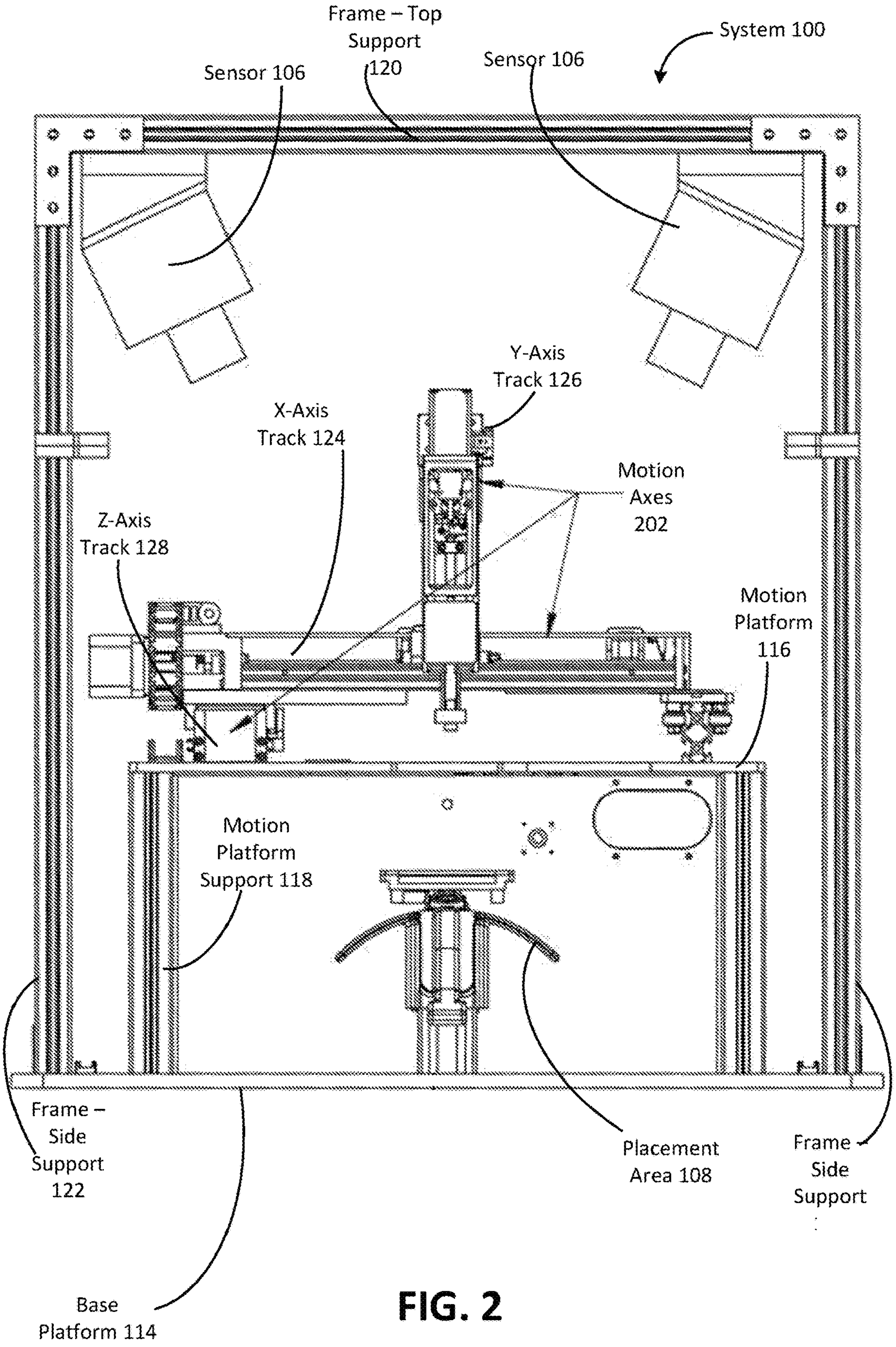
FIG. 2 is a front view of a system for nail shaping, in accordance with an embodiment.

FIG. 2 illustrates a front view of the system or assembly 100, including illustrating a motion platform 116 of a nail filing or shaping assembly, according to an embodiment. The motion platform 116 may be a cartesian gantry or multi-axis robotic arm that moves the nail filing subsystem (NFS) into place for the shaping operation. The motion platform 116 moves the NFS according to a path determined by the path planning model to abrade away the prescribed amount of nail. In one embodiment, the nail assembly can also be used to apply nail polish. The motion platform 116 is capable of moving the NFS for nail shaping and nail polish application. The motion platform 116 may be designed to move the platform back and forth along an x, y, or z axis 202 (motion axes), or otherwise move to position the NFS. In some embodiments, the hand or foot placement area 108 may also or alternatively be movable for placement of the nail for shaping or polishing. In this embodiment, the placement area 108 may be moved up and down, side to side, back and forth. It may be moveable, for example, along one or more tracks that provide movement in different axes. The motion platform 116 is held up by a motion platform supports 118. The system also includes one or more motors moving the end effector 102 x-axis track 124 along the z-axis track 128.

End Effector

Figure 3:
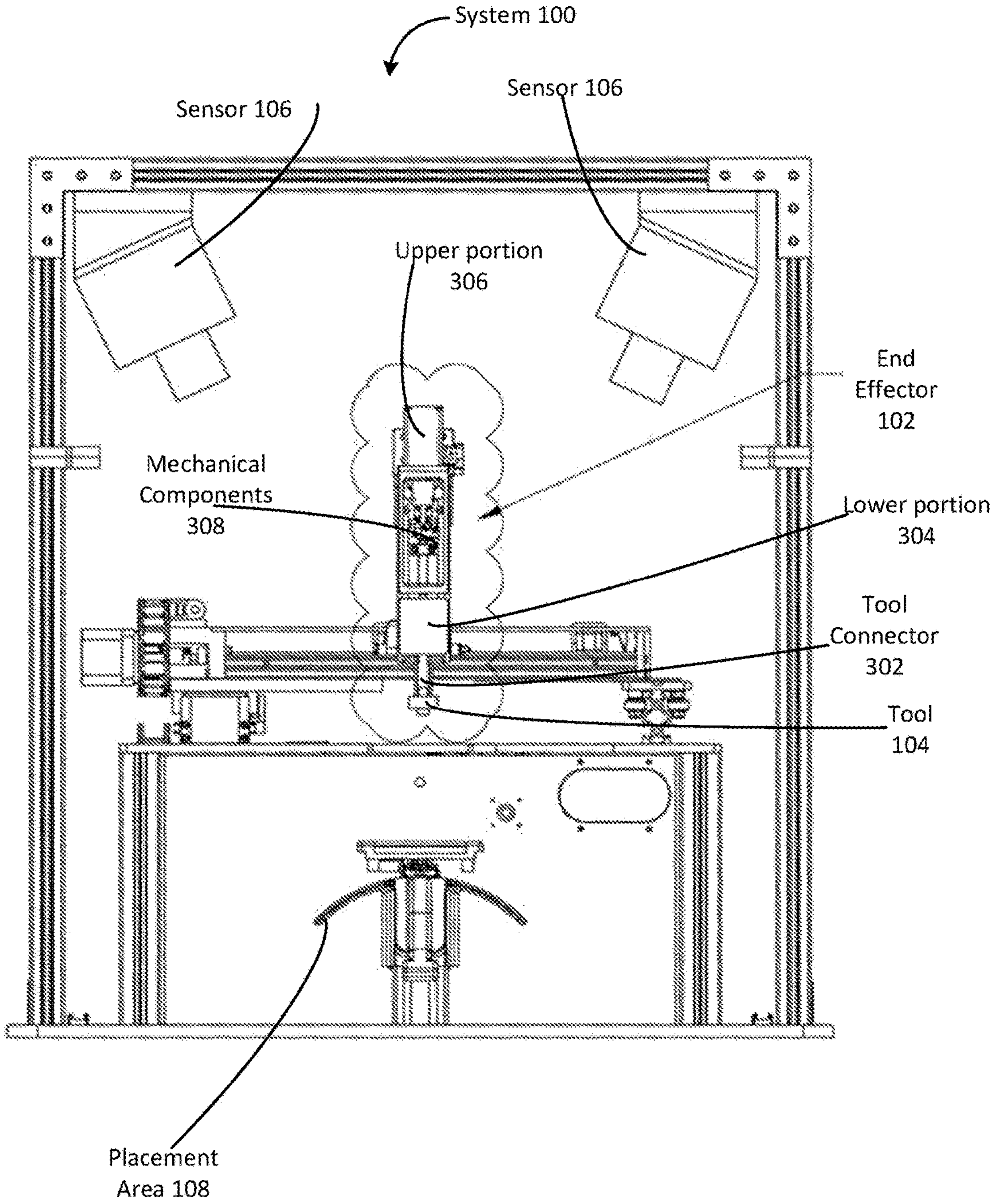
FIG. 3 is a front view of a system for nail shaping highlighting an end effector, in accordance with an embodiment.

FIG. 3 illustrates a front view of the system or assembly 100, including illustrating an end effector 102 of a nail filing assembly, according to an embodiment. The end effector 102 holds the working tool 104 that interacts with nails. The tool 104 is fixed to a lower portion 304 of the end effector 102 by a tool connector 302 that includes a kinematic mount and an actuated locking pin. In some embodiments, the tool is removably fixed to the end effector, such that the tool can be removed and cleaned or replaced with other tools. The kinematic mount 604, 614 (see FIGS. 6A and 6B) and actuated locking pin allow for pickup and drop off of the tool with accurate location assurance without dropping the tool. Electrical power connections to the work tool 104 can be achieved via spring loaded contacts. The end effector 102 includes a lower portion 304, an upper portion 306 at the top of the end effector 102, and an area in between. FIG. 3 shows the mechanical components 308 in the area in between.

The nail filing assembly may include a tool changing system that can change between nail polish application tools and nail shaping tools on the end effector. The tool changing may be automatically performed by the tool changing system. In some embodiments, one or more tools may be manually removed and replaced by a user.

3D Sensor Suite

Figure 4:
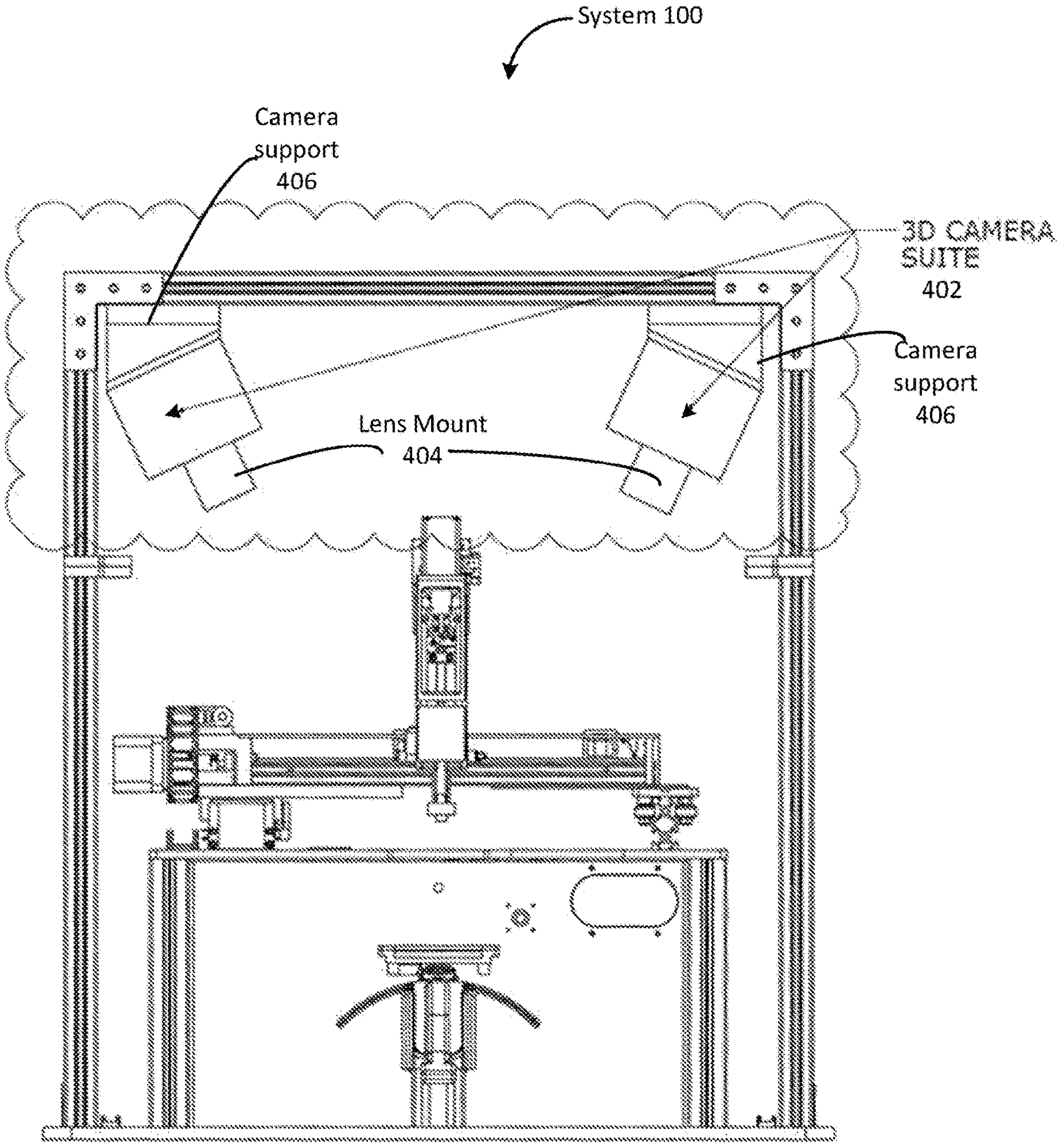
FIG. 4 is a front view of a system for nail shaping highlighting a 3D camera suite, in accordance with an embodiment.

FIG. 4 illustrates a front view of the system or assembly 100, including a 3D sensor suite 402, according to an embodiment. The 3D sensor 402 includes cameras capable of generating 3D spatial point clouds based on images of the nail to be shaped. The cameras are mounted to the frame by camera supports 406 for each camera. The cameras include lens mounts 304 that hold the lenses of the camera, though other camera designs without lens mounts are also possible. The cameras generate a point cloud used to generate a representative surface of the nail. The abrading operation may take place once or multiple times. The nail is imaged by the 3D sensor suite 402 before performing nail shaping or nail material removal. The material removal rate and the path plan can be determined based on the representative surface generated by the cameras to get the desired shape.

Shaping Subassembly

Figure 5:
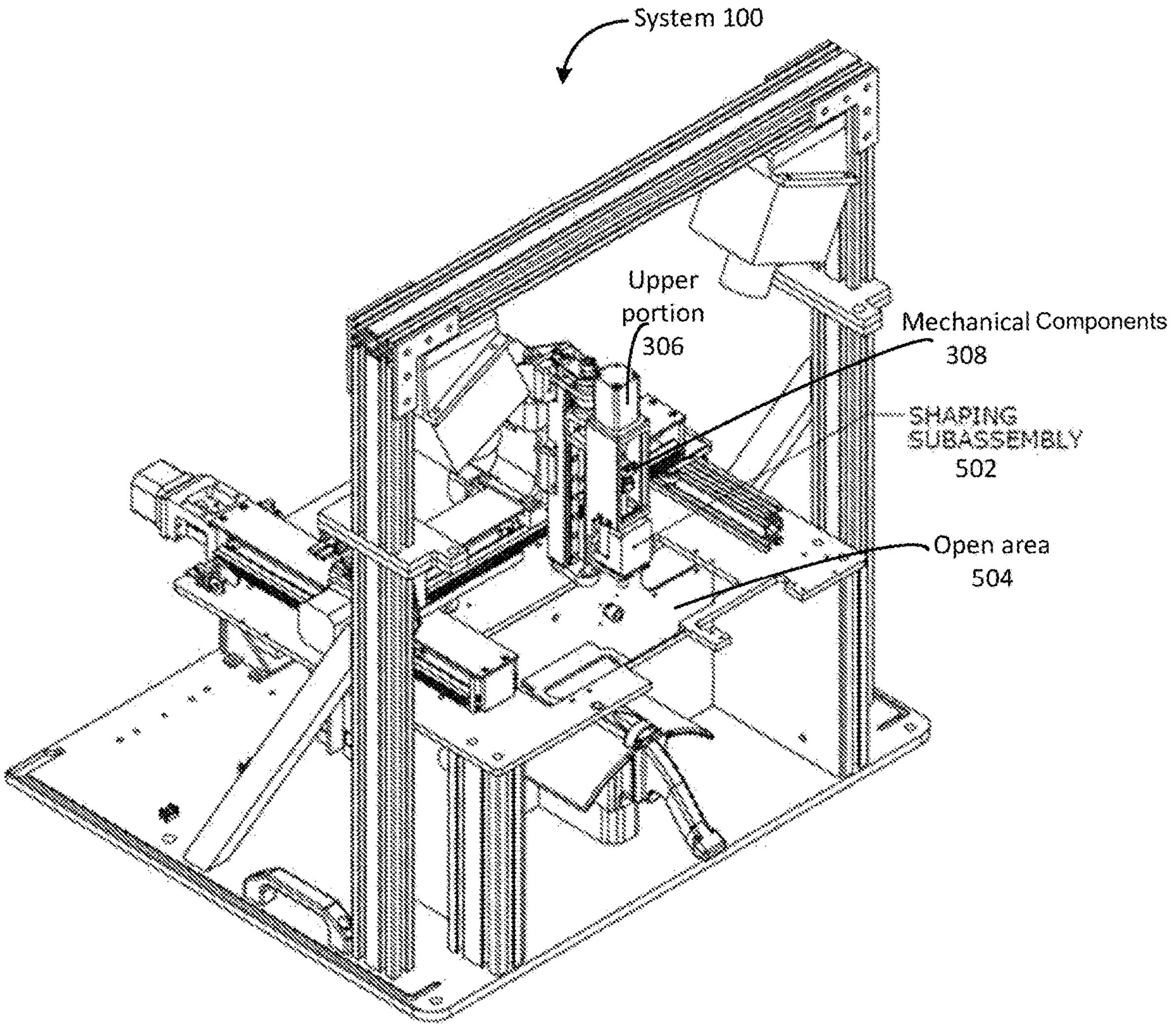
FIG. 5 an isometric view of a system for nail shaping highlighting a shaping subassembly, in accordance with an embodiment.

FIG. 5 illustrates a front perspective view of the system or assembly 100, including a shaping subassembly 502, according to an embodiment. The shaping subassembly 502 is a tool that contains the moving parts that abrade away material from the targeted nail. The main components of the shaping subassembly are the drive motor 602, 612 (see FIG. 6A, B) the abrasive tool 104, and the kinematic mount interface 604, 614 (see FIG. 6A, 6B). The abrasive tool 104 can be comprised of a rotating drum, shaped cutter, or rotating belt. The drive motor produces a rotating or sliding motion for the abrasive tool, whereby it can abrade away the nail material as the tool comes into contact with it. The tool 104 is moved through the open area 504 in the motion platform 116. The kinematic mount 604, 614 allows the subassembly to be held by the end effector 102.

Nail Shaping Tools

Figure 6A:
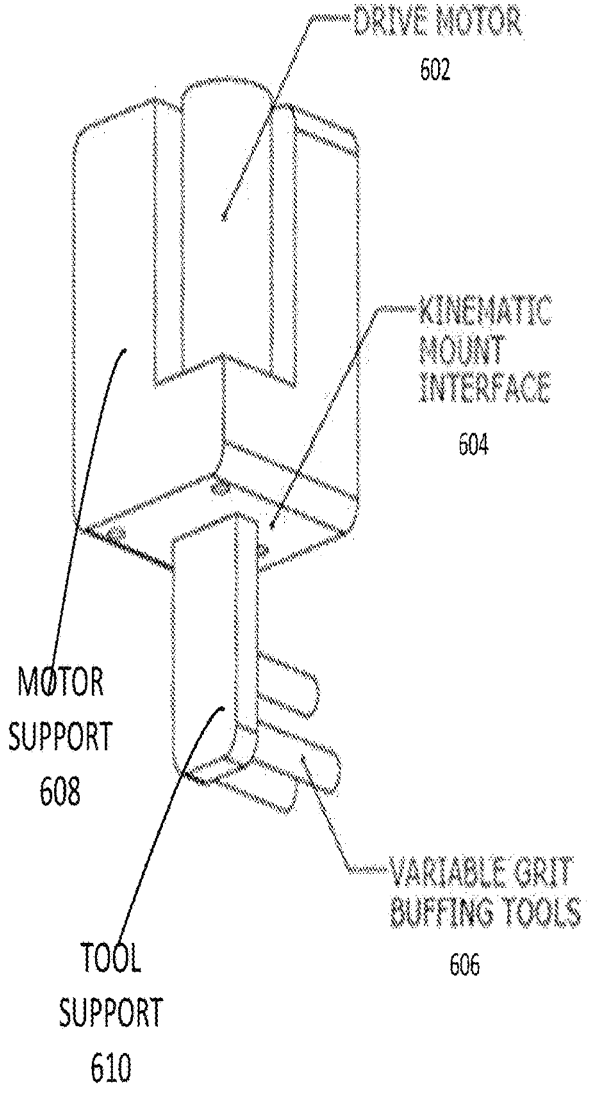
FIG. 6A is an illustration of a nail shaping device with variable grit buffing tools, in accordance with an embodiment.

FIG. 6A illustrates a nail buffing tool, according to an embodiment. A set of variable grit buffing tools 606 are attachable to a kinematic mount interface 602, and the drive motor 604 causes the grit buffing tools 606 to contact the nails to buff the surface of the nails. The drive motor 604 sits in a motor support 608. Above the kinematic mount interface 602. The tools 606 may be attached to a tool support 610 that extends from the kinematic mount interface 602. The variable grit buffing tools 606 allow for various rates of buffing. The motor 604 may move the tools on the tool support 610 so that different of the variable grit buffing tools 606 are positioned to contact the nail for buffing. Thus, a first one of the tools 606 may be positioned for a buffing with a coarser grit, then the tools 606 may be moved to position a second tool 606 for buffing with a less coarse grit, then the tools 606 may be moved again to position a third tool 606 for buffing with the finest grit. There could be fewer or more tools 606 on the tool support 610, or different type of tools besides buffers. The tools may be moved on the tool support to position the tools, or the tool support itself may be moved to position the tools.

Figure 6B:
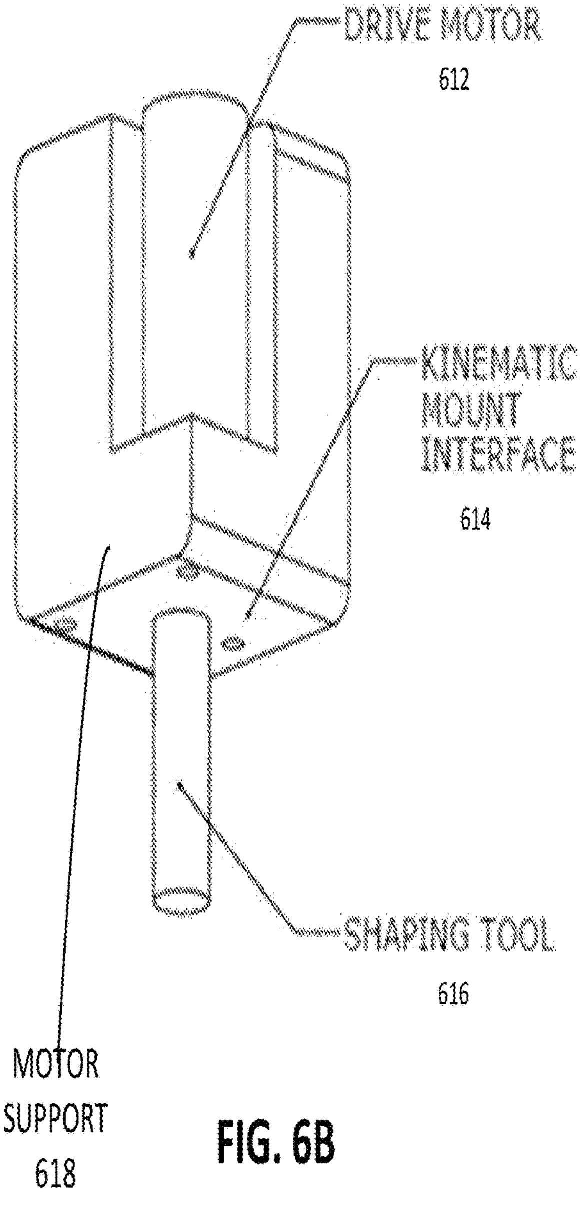
FIG. 6B is an illustration of a nail shaping device with a shaping tool, in accordance with another embodiment.

FIG. 6B illustrates a shaping tool, according to an embodiment. The shaping tool 616 is attachable to the kinematic mount interface 614 and is configured to remove nail material along edges. There is a drive motor 612 that is positioned on a motor support 618. This tool 616 may be moved along the nail edge. It may be a spinnable tool that spins against the nail edge, or it may be rubbed against the nail edge by the end effector 102 moving it back and forth along the nail edge.

Although not illustrated, a nail filing assembly may include a debris collection subassembly that assists to pull abraded nail dust away from the user's finger and the nail shaping area. The debris collection subassembly may use a dry evacuation or a wet rinse process. The dry evacuation process of removing nail particles can be either accomplished by directing a pressurized air flow at the nail during sanding or by vacuuming the material away near the work tool. If a wet process is used, a small jet of water can be directed onto the nail surface near the work tool to help carry away abraded particles. Either wet or dry removed material can be collected in a waste storage container for eventual collection at a periodic frequency.

Figure 7A:
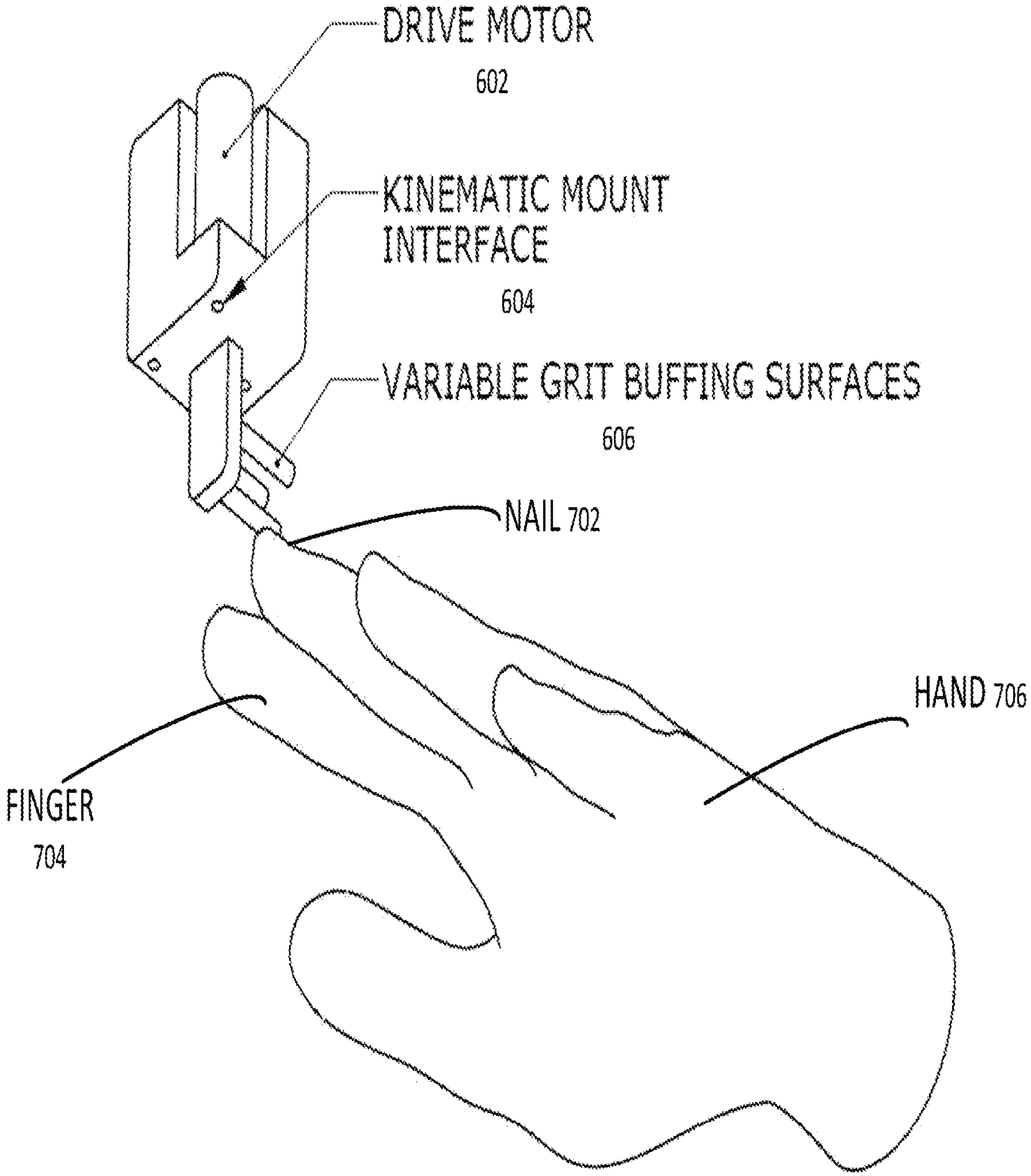
FIG. 7A is an illustration of the device of FIG. 6A applied to a hand, in accordance with an embodiment.
Figure 7B:
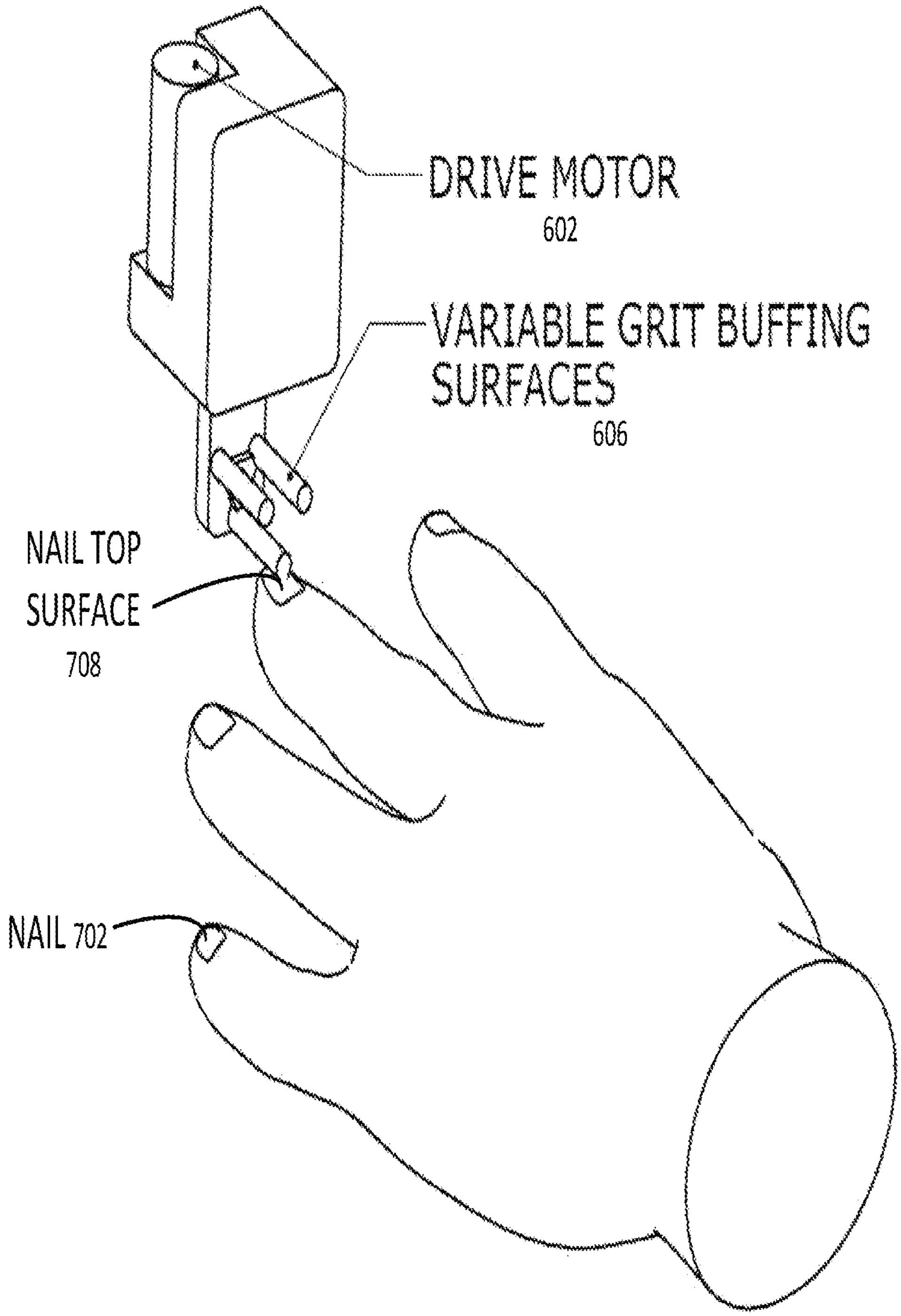
FIG. 7B is an illustration of the device of FIG. 6A applied to a hand, in accordance with an embodiment.
Figure 7C:
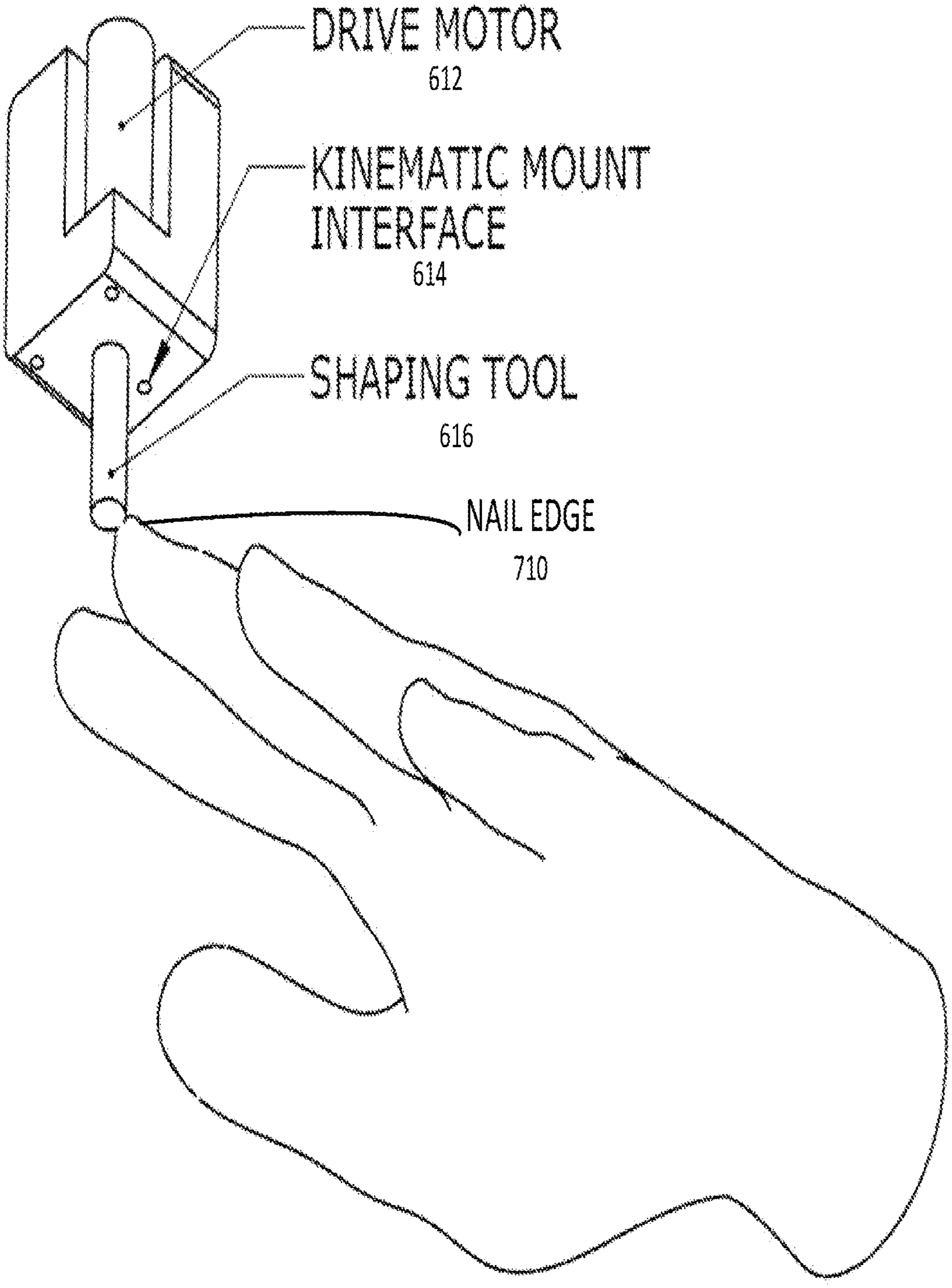
FIG. 7C is an illustration of the device of FIG. 6B applied to a hand, in accordance with an embodiment.

FIGS. 7A-7C illustrate a position of an end effector 102 relative to a user's hand 706. These illustrate how shaping and buffing surfaces may contact the nail 702 on the finger 704 of the user's hand 706. FIG. 7B shows three variable grit buffing surfaces. The system can rotate or reposition the buffing surfaces so different ones of the surfaces contact the user's nail top surface 708 depending on the desired level of buffing. A similar variable design could also be used for the shaping tool where variably shaping surfaces may be included and rotatable or repositionable as desired to select different surfaces for shaping the nail. In some embodiments, a user instructs the system which surfaces to apply before or during the shaping. In other embodiments, the system determines automatically which surfaces to use, which may be customized for a particular user's nails or determined based on a particular desired or selected nail shape. In this embodiment, the system automatically switches between different surfaces as the shaping program is executed.

In some embodiments, the system includes a computer or a computer processor that executes code or instructions stored on a computer-readable storage medium or memory inside the system. The system can include a graphical user interface with which a user can interact to select certain features, such as nail shape or nail length. In some embodiments, an administrative user, such as a staff member or employee in a salon or other business that provides nail shaping services operates the system and provides instructions on the graphical user interface according to the request of an end user or client whose nails are to be shaped using the system. In other embodiments, the end user or client makes selections or provides instructions to the system directly using the user interface. In some embodiments, the system is designed and sized to be for home user by a user, in which case it can be a compact system that can be stored at home. The system may include a touch screen, or physical buttons, or a keyboard, or mouse, or other mechanism for interaction to allow the user to provide instructions.

Nail Shaping Method

Figure 8:
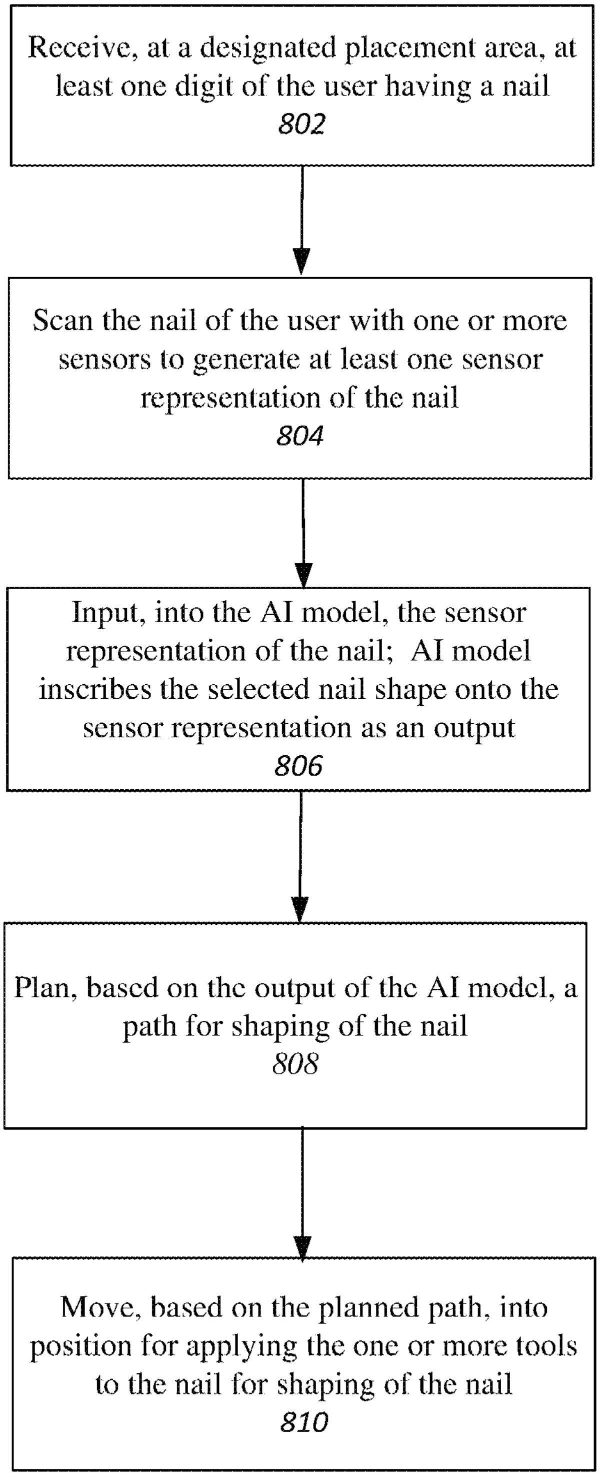
FIG. 8 is a flowchart illustrating a method of nail shaping, in accordance with an embodiment.

FIG. 8 is a flowchart illustrating a method of nail shaping or other modification, according to an embodiment. The method may include more, fewer, or different steps according to other embodiments. The system is designed to operate entirely automatically to perform the nail shaping, and in some cases, also nail polishing. In one embodiment, the user provides instructions or selection of the desired nail shape and/or length, and in some cases also selects nail polish color along with other options (cuticle trimming, nail buffing, base coat of nail polish, topcoat of nail polish, French manicure, other nail coatings, etc.). But in other embodiments, the system selects the nail shape and/or length.

The user inserts a hand or foot into the system, in some embodiments. The system thus receives 802, at a designated placement area, at least one digit of the user having a nail. The system scans 804 the nail of the user with one or more sensors (e.g., 3D sensor suite) to generate at least one sensor representation of the nail. The sensor representation (e.g., image) of the nail and any user provided selections (if included) are provided as input to the AI model that determines how much nail to remove from various parts of the nail to match the selected nail shape. So, the method includes inputting 806, into the AI model, the sensor representation of the nail, and includes the AI model inscribing the selected nail shape onto the sensor representation as an output. The path planning model also plans 808 based on the output of the AI model, a path for shaping of the nail. The path plan is a plan for the end effector to follow for the nail removal.

In some embodiments, the end effector receives the first tool to be used for nail shaping. The end effector may itself select and attach the tool, or another component or arm (e.g., a tool changing system) may deliver to the tool to the end effector for attachment to the end effector. In other embodiments, the tool is already on the end effector.

The end effector on the motion platform is moved 810, based on the planned path, into position for applying the one or more tools to the nail for shaping of the nail. Thus, the end effector is moved into place and performs the initial steps in nail shaping, such as steps of coarse reduction in length or cutting of the nail, or coarse abrasion to reduce nail length. When this initial shaping is complete according to the path plan, a second tool may be used for the next step in shaping, such a finer removal of nail material. This second tool may be selected and attached to the end effector, or in some cases the second tool may be a different portion of the same tool, such as where a single tool has more than one head or surface, and the tool rotates or shifts to place a new surface in contact with the nail.

This process continues with the system selecting one or more tools to achieve the desired nail shape. One or more tools may also operate simultaneously on the user's nails. In some embodiments, one or more tools may then be automatically selected by the system to apply the nail polish to the nails. In some embodiments, other types of nail care may occur, such as with cuticle trimming tools, or nail buffing tools.

Once the process is complete and the desired services have been performed on the nail, the user can remove his or her hand or foot. All of the steps between insertion of the hand/foot into the system to removal of the hand/foot from the system with completed nails can be automated and performed by the system without user input or control of the components other than initial input of instructions via a user interface.

Additional Considerations

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device (such as a specific computing machine), that manipulates and transforms data represented as physical (electronic) quantities within the computer system memories or registers or other such information storage, transmission or display devices.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

What is claimed is:

1. A system comprising:

a placement area configured for a user to place at least one digit having a nail;

a motion platform adjacent the placement area;

an end effector movably connected to the motion platform and positioned near the placement area, the end effector comprising one or more tools for nail shaping;

one or more sensors near the placement area and configured for scanning the nail of the user to generate a sensor representation for the nail;

an artificial intelligence (AI) model trained for receiving as input the sensor representation of the nail and for inscribing a selected nail shape onto the sensor representation, the AI model configured to output at least one indicator of an amount of nail material to be removed from the nail to achieve the selected nail shape, wherein the AI model is configured to determine a minimum amount of nail material to be removed from the nail to achieve the selected nail shape by performing an optimization that compares the selected nail shape inscribed onto the sensor representation to a current geometry of the nail captured in the sensor representation; and a path planning model configured to receive the output of the AI model and to plan a path of movement for the end effector to shape the nail based on the output of the AI model, the end effector configured to move on the motion platform into position based on the planned path for applying the one or more tools to the nail to shape the nail.

2. The system of claim 1, wherein the one or more sensors comprise one or more cameras.

3. The system of claim 1, wherein the one or more sensors comprise a 3D sensor suite.

4. The system of claim 3, wherein 3D sensor suite comprises one or more cameras capable of generating a 3D spatial point cloud.

5. The system of claim 4, wherein the sensor representation comprises one or more images of the nail to be shaped, and wherein the 3D spatial point cloud is generated based on the one or more images, which provides a representative surface of the nail, wherein the path is planned based on the representative surface generated by the one or more cameras to provide the selected nail shape.

6. The system of claim 1, wherein the selected nail shape is selected by the user.

7. The system of claim 1, wherein the one or more tools of the end effector comprise a first tool and a second tool, and wherein a drive motor on the end effector is configured to move the first tool away from the nail following use and to move the second tool into position to perform further shaping of the nail.

8. The system of claim 7, wherein the end effector comprises at least a third tool, and wherein the drive motor on the end effector is configured to move the third tool into position for modifying the nail.

9. The system of claim 1, wherein the system is configured to move the end effector away from the placement area to perform a tool replacement to remove a first tool of the one or more tools and replace it with a second tool of the one or more tools, wherein the second tool is moved into position at the placement area for additional nail shaping.

10. The system of claim 1, wherein each of the one or more tools is connected to a nail shaping subassembly that is replaceable to attach a different nail shaping subassembly to the end effector to provide a different tool.

11. The system of claim 10, wherein each nail shaping subassembly comprises a drive motor.

12. The system of claim 10, wherein each nail shaping subassembly comprises a kinematic mount interface.

13. The system of claim 10, wherein the nail shaping subassembly comprises a drive motor and a tool support holding two or more tools, and wherein the drive motor is configured to move the two or more tools to position each tool at the nail for performing a specific nail shaping procedure.

14. The system of claim 1, wherein the one or more tools comprise different tools for performing different nail shaping tasks.

15. The system of claim 14, wherein the one or more tools are selected from a group consisting of: a nail file, a nail clipper, a nail buffer, a cuticle trimmer, a cuticle oil depositor, and a nail cleanser.

16. The system of claim 14, wherein the one or more tools comprise nail shaping tools each having variable grit surfaces, and wherein different ones of the one or more tools are selected based on a level of grit needed to perform a specific nail shaping procedure.

17. The system of claim 14, wherein at least one of the one or more tools is configured to be positioned at an end of the nail for shaping an edge of the nail.

18. The system of claim 14, wherein at least one of the one or more tools is configured to be positioned above the nail for modifying a top surface of the nail.

19. The system of claim 1, comprising a frame having a top support and side supports, the frame having the one or more sensors mounted to it by sensor supports.

20. The system of claim 19, wherein the one or more sensors comprise two cameras, a first camera of the two cameras mounted on a first end of the top support and a second camera of the two cameras mounted on a second end of the top support, wherein the two cameras each have lens aimed at the placement area.

21. The system of claim 1, wherein the motion platform is mounted on a base platform by motion platform supports.

22. The system of claim 21, wherein at least one z-axis track is mounted to the motion platform.

23. The system of claim 22, wherein an x-axis track is moveably mounted to the z-axis track, the x-axis track designed to slide back and further along a z axis to move the end effector forward and backward relative to the nail.

24. The system of claim 23, wherein the x-axis track is configured to allow the end effector to slide from side to side along the motion platform to move the end effector from side to side relative to the nail.

25. The system of claim 23, wherein a y-axis track is moveably mounted to the x-axis track, the y-axis track designed to move the end effector up and down relative to the nail.

26. The system of claim 1, wherein the placement area comprises a restraint for holding the at least one digit in place during the shaping of the nail.

27. The system of claim 1, wherein the placement area comprises a resting support for resting a hand of a user during nail shaping.

28. The system of claim 1, wherein the end effector is moveable along at least three motion axes for shaping of the nail.

29. The system of claim 1, wherein the system is a robotic system for automated shaping of the nail of the user without requiring user input during the shaping.

30. The system of claim 1, wherein the end effector is moveable for replacing the one or more tools for nail shaping with one or more tools for nail polishing following the nail shaping, wherein the system moves the end effector to polish the nail.

31. A method comprising:

receiving, at a designated placement area, at least one digit of a user having a nail;

scanning the nail of the user with one or more sensors to generate at least one sensor representation of the nail;

inputting, into an artificial intelligence (AI) model, the at least one sensor representation of the nail, wherein the AI model outputs at least one indicator of an amount of nail material to be removed from the nail to achieve a selected nail shape by inscribing the selected nail shape onto the at least one sensor representation, wherein the AI model is configured to determine a minimum amount of nail material to be removed from the nail to achieve the selected nail shape by performing an optimization that compares the selected nail shape inscribed onto the sensor representation to a current geometry of the nail captured in the sensor representation;

planning, based on the output of the AI model, a path for shaping of the nail; and moving, based on the planned path, an end effector having one or more tools into position for applying the one or more tools to the nail for shaping of the nail.

32. The method of claim 31, further comprising receiving, at a user interface, a selection by a user of a nail shape or a nail length.

33. The method of claim 31, wherein the one or more tools of the end effector comprise a first tool and a second tool, and further comprising moving, based on the planned path, the end effector with a second tool into position for applying the second tool to the nail for nail shaping.

34. The method of claim 33, further comprising moving, based on the planned path, the end effector with a third tool into position for applying the third tool to the nail for polishing the nail.

35. The method of claim 33, further comprising moving the first tool away from the nail following use and moving the second tool into position to perform further shaping of the nail.

36. The method of claim 31, further comprising generating a 3D spatial point cloud with based on at least one image of the nail to be shaped, which provides a representative surface of the nail, wherein the path is planned based on the representative surface generated to get the selected shape.

37. The method of claim 31, further comprising generating a 3D spatial point cloud with a 3D sensor suite.

38. The method of claim 37, wherein the sensor representation comprises one or more images of the nail to be shaped, and wherein the 3D spatial point cloud is generated based on the one or more images, which provides a representative surface of the nail, and further comprising planning the path based on the representative surface generated by at least one camera to provide the selected nail shape.

39. The method of claim 31, further comprising moving the end effector away from the placement area to perform a tool replacement to remove a first tool of the one or more tools and replace it with a second tool of the one or more tools, wherein the second tool is moved into position at the placement area for additional nail shaping.

40. The method of claim 31, wherein the one or more tools comprise different tools for performing different nail shaping tasks, wherein the one or more tools are selected from a group consisting of: a nail file, a nail clipper, a nail buffer, a cuticle trimmer, a cuticle oil depositor, and a nail cleanser.

41. The method of claim 31, wherein the one or more tools comprise nail shaping tools each having variable grit surfaces, and further comprising selecting tools based on a level of grit needed to perform a specific nail shaping procedure.

42. The method of claim 31, further comprising moving the end effector along at least three motion axes for shaping of the nail.

* * * * *